April 29, 1958

D. GRUDIN 2,832,586

SHOCK ABSORBER

Filed Aug. 8, 1957

INVENTOR
Daniel Grudin

BY

ATTORNEY

United States Patent Office 2,832,586
Patented Apr. 29, 1958

2,832,586

SHOCK ABSORBER

Daniel Grudin, Trenton, N. J.

Application August 8, 1957, Serial No. 677,148

10 Claims. (Cl. 267—1)

This invention relates to a shock absorber, and more particularly, to an improved fluid type shock absorber wherein there are no moving seals that can possibly leak fluid to the exterior. This application is a continuation-in-part of my copending application Serial No. 602,313 filed August 6, 1956, now abandoned.

One application of shock absorber embodying this invention is as a replacement for "shock cord" where higher loads are encountered. Still another application is that of a tension member between a prime mover and a towed load. Other applications will become evident from the detailed description appearing hereinafter.

Hence, it is an object of this invention to provide an improved tension type shock absorber which utilizes fluid flow through a restricted orifice for absorbing shocks.

It is another object of this invention to provide a shock absorber of the type under consideration that is free of moving exterior seals.

It is a further object of this invention to provide an improved shock absorber that is relatively simple in construction with resulting economy in manufacture.

Other objects and advantages will become apparent from the following description and accompanying drawing, in which.

Figure 1:
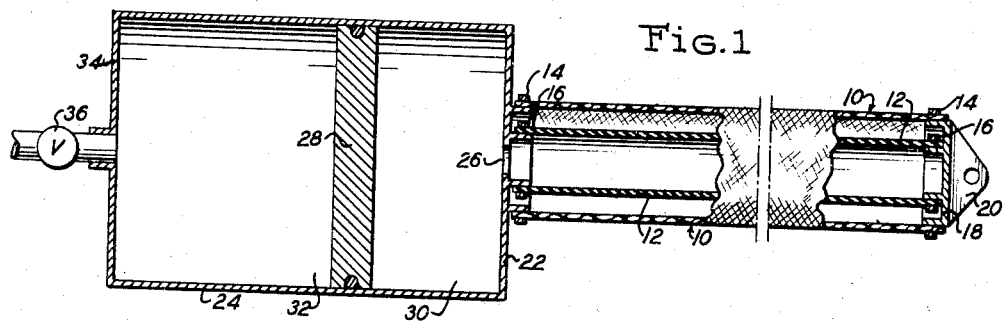
Fig. 1 is a side view, partly in longitudinal section, of a shock absorber embodying the invention.

Referring now to the drawings: A shock absorber embodying this invention may include a shell or tube 10 of braided mesh construction, preferably formed of either multiple strand wire braids or single metal bands. Because of its braided construction, the shell 10 can elongate and contract, within limits, with a consequent reduction or increase, respectively, in transverse dimension. Preferably, the separate braids or bands of the shell 10 are lubricated in relation to each other to facilitate elongation and contraction of the shell.

Disposed concentrically within, and preferably of smaller diameter than the shell 10 is an elastic tube 12 of a durable appropriate rubber-like material. At one end, both the shell 10 and tube 12 are secured, as by clamping rings 14 and 16, to an end cap 18 provided with means, such as an apertured lug 20, to connect the shock absorber to a movable member (not shown). It will be noted that the cap 18 completely seals the adjacent end of the elastic tube 12.

At their other ends, the tubes 10 and 12 are secured, as by clamping rings 14 and 16 to one end 22 of a rigid cylinder 24. A restricted orifice 26 in the cylinder end 22 provides communication between the interior of the cylinder 24 and the interior of the elastic tube 12.

A short piston 28 divides the interior of the cylinder 24 into two chambers 30 and 32, with the chamber 30 being in communication with the tube 12 through the orifice 26. The other end 34 of the cylinder 24 is closed, except for means, such as the valve 36, for introducing air under pressure into the chamber 32.

Figure 2:
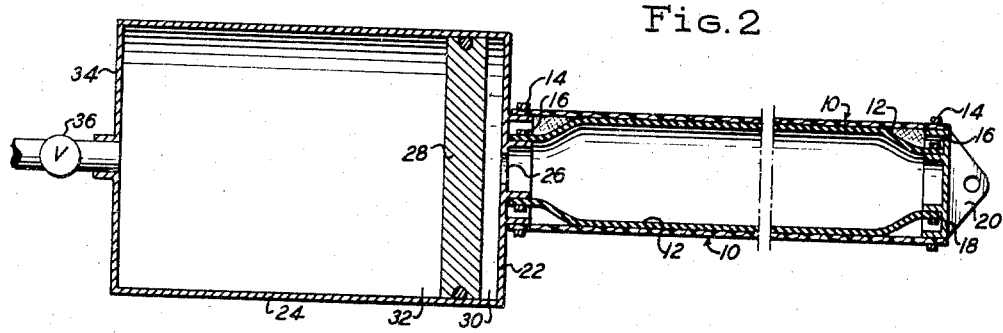
Figure 2 is a view corresponding to Figure 1, but showing the pressurized condition of the shock absorber.

Prior to use of the shock absorber, the elastic tube 12 and the chamber 30 are filled with a non-compressible fluid, e. g. oil, to an extent sufficient for the piston 28 to be disposed about midway of the length of the cylinder 24, as shown in Figure 1. Air under pressure is then introduced through the valve 36 into the chamber 32 until the resulting movement of the piston 28 pressurizes the oil sufficiently to expand the elastic tube 12 into engagement with the interior walls of the braided shell 10, as shown in Figure 2. The valve 36 then is closed to retain both the oil and air in the shock absorber under a residual pressure.

In use, the shock absorber is connected as a tension member between two relatively moving elements. For example, the shock absorber may constitute a draft link between a prime mover (not shown) and a towed load (not shown).

When the shell 10 and tube 12 are placed under a tension shock force, the shell will elongate with a consequent reduction in transverse dimension. The amount and rate of such reduction is dependent on the angle of wrap of the braided shell 10, i. e. the helix angle of the braids. This reduction in cross-sectional area of the shell 10 forces a corresponding reduction in cross-sectional area of the elastic tube 12 with a consequent reduction in volume in the latter. As a matter of fact, the tube 12 elongates with the shell 10, so that the tube likewise decreases in cross-sectional area, although it also is forced to do so by the shell.

The reduction in volume of the tube 12 increases the pressure of the oil therein to cause displacement of the oil through the orifice 26 into the chamber 30 with a resulting movement of the piston 28 in a direction to compress the air in the chamber 32. This displacement of the oil is an effective means of shock absorption, as the increased dynamic energy is dissipated into heat by the orifice restriction 26.

Once the shock force is relieved, the increased pressure in the chamber 32 urges the piston 28 to return to its normal position, thus displacing oil back into the tube 12 to expand the shell 10 and cause contraction of both the shell and tube.

It will be seen that the use of the shock absorber as a draft link will enable a prime mover to pull a load with both traction and kinetic energy without danger of breaking the draft connections. In the application of loads to draft connections, stiffness therein causes high load factors due to impacts. Therefore, the kinetic energy causes breakage of the connections.

Resilient controlled loads, on the other hand, as afforded by this invention, will permit the kinetic energy to be used. Such energy can be many times the traction effort available from a prime mover, and even though available for short duration, is very useful.

It is also pointed out that the shock absorber can carry high loads because of the metal construction of the shell 10. Furthermore, because of the orifice 26, contraction of the shell after elongation also is controlled. Hence, two-directional shock absorber action is allowed.

The shock absorber of the present invention can be used with great advantage in high temperature applications. The wire braided outer sleeve disclosed herein possesses not only great mechanical strength, but is also heat-resistant. This is particularly important because, the present trend in the manufacture of heat-resistant rubber-like materials is such that while resilience is maintained at high temperatures, there is a loss in mechanical strength. However, in the case of the multi-layer structure disclosed by applicant, the outer wire cover of the shock absorber constitutes the strength-giving member of the combination and provides the necessary mechanical strength, while the inner member of rubber-like material provides the requisite resilient seal for the internal pressure.

Figure 3:
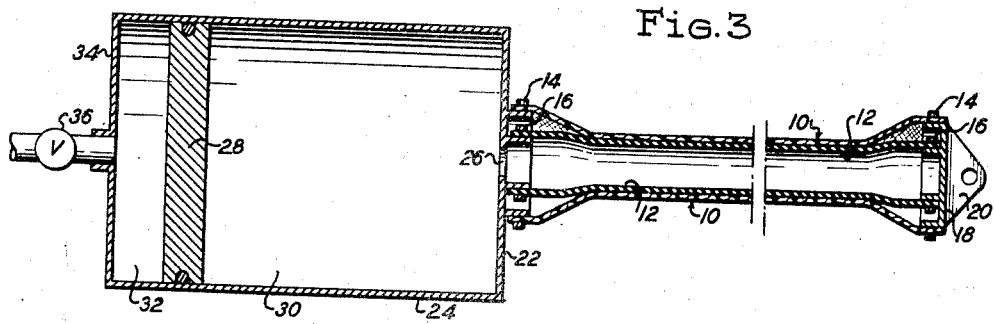
Figure 3 is a view corresponding to Figure 2, but showing the extended condition of the shock absorber.
Figure 4:
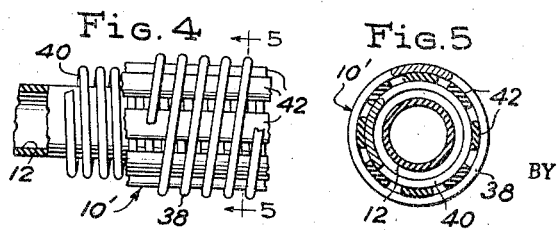
Figure 4 is a fragmentary view corresponding to Figure 1, of another embodiment of this invention.
Figure 5:
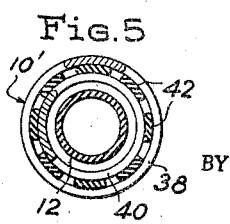
Figure 5 is an enlarged sectional view taken on line 5—5 of Figure 4.

The embodiment of the invention illustrated in Figures 4 and 5 is substantially identical to that illustrated in Figures 1 to 3, except that the outer shell is not of braided construction. Instead, the shell 10' is formed of at least two layers 38 and 40 of oppositely wound wire or metal band helices each wound as a single lamination. Obviously, elongation or contraction of such a shell 10' will result in a reduction or increase, respectively, in the transverse dimension. Such a shell construction results in less friction between the strands of the two layers 38 and 40 than between the strands of a braided construction because, in the latter, the strands are somewhat deformed at the cross-over junctions. Hence, the construction shown in Figures 4 and 5 allows, more readily, contraction of the shell 10' by the pressure in the tube 12. Additionally, repetitive operation is possible without excessive build-up of heat due to friction between the strands of the two layers 38 and 40.

As illustrated in Figures 4 and 5, flexible lubricating inserts 42, each formed as a longitudinal segment of a hollow cylinder, can be employed to separate the layers 38 and 40 of the shell 10' to further reduce friction between such layers. In lieu of such inserts 42, the wires or bands of each layer 38 and 40 may be appreciably treated to form a lubricating coating (not shown) thereon.

It thus will be seen that the objects of this invention have been fully and effectively accomplished. It will be realized, however, that the specific embodiments disclosed to illustrate the principles of this invention are susceptible of modification without departure from such principles. Therefore, this invention includes all embodiments encompassed within the spirit and scope of the following claims.

I claim:

1. A shock absorber comprising an extensible tubular tension element that is transversely contractible on longitudinal elongation and longitudinally contractible on transverse expansion; means defining within said element and extending substantially from end to end thereof, a first closed chamber having a fluid-tight, elastic side wall; a rigid housing; a movable wall dividing the interior of said housing into second and third fluid-tight chambers; and means including a flow restriction communicating said first and second chambers, said latter chambers being filled with a substantially non-compressible fluid and said third chamber being filled with a compressible fluid.

2. The structure defined in claim 1, in which the compressible fluid is subjected to a pressure above atmospheric.

3. The structure defined in claim 1, in which the tension element comprises braided metal mesh.

4. The structure defined in claim 1, in which the tension element comprises at least two layers of oppositely wound metal strand helices.

5. The structure defined in claim 4, including a plurality of longitudinally extending, flexible lubricating elements disposed between the layers.

6. A shock absorber comprising: a braided metal mesh tube; an elastic tube disposed coaxially within said metal tube; rigid means secured to one end of said metal tube and to the adjacent end of said elastic tube, and sealing said ends of the latter; a cylinder having one end thereof secured to the other end of said metal tube and sealing the other end of said elastic tube; a piston in said cylinder dividing the interior thereof into a first chamber adjacent said other tube end, and a second chamber remote therefrom; restricted orifice means communicating said first chamber with the corresponding end of said elastic tube; and means for introducing air under pressure into said second chamber, said first chamber and said elastic tube being filled with a liquid.

7. The structure defined in claim 6, wherein the elastic tube is formed of rubber-like material.

8. A shock absorber comprising: a tube comprising at least two layers of oppositely wound metal strand helices; an elastic tube disposed coaxially within said metal tube; rigid means secured to one end of said metal tube and to the adjacent end of said elastic tube, and sealing said ends of the latter; a cylinder having one end thereof secured to the other end of said metal tube and sealing the other end of said elastic tube; a piston in said cylinder dividing the interior thereof into a first chamber adjacent said other tube end, and a second chamber remote therefrom; restricted orifice means communicating said first chamber with the corresponding end of said elastic tube; and means for introducing air under pressure into said second chamber, said first chamber and said elastic tube being filled with a liquid.

9. The structure defined in claim 8 in which the elastic tube is formed of rubber-like material.

10. The structure defined in claim 8 including a plurality of longitudinally extending, flexible lubricating elements disposed between the layers of the tube.

References Cited in the file of this patent

UNITED STATES PATENTS

| | | |
|---|---|---|
| 433,657 | Riegel | Aug. 5, 1890 |
| 1,002,448 | Putnam | Sept. 5, 1911 |
| 2,392,387 | Joy | Jan. 8, 1946 |
| 2,776,830 | Govirand | Jan. 8, 1957 |